US009939809B1

(12) United States Patent
Obaidi

(10) Patent No.: US 9,939,809 B1
(45) Date of Patent: Apr. 10, 2018

(54) REMOTE VEHICLE ENGINE IMMOBILIZATION

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/282,572

(22) Filed: Sep. 30, 2016

(51) Int. Cl.
*G05D 1/00* (2006.01)
*G07C 5/00* (2006.01)

(52) U.S. Cl.
CPC .......... *G05D 1/0011* (2013.01); *G07C 5/008* (2013.01); *B60R 2325/101* (2013.01); *B60R 2325/103* (2013.01); *B60R 2325/105* (2013.01); *G05D 2201/0213* (2013.01)

(58) Field of Classification Search
CPC ......... G05D 1/0011; G05D 2201/0213; G07C 5/008; B60R 2325/101; B60R 2325/103; B60R 2325/105
USPC .................................................. 340/426.11
See application file for complete search history.

(56) References Cited

U.S. PATENT DOCUMENTS

| | | | | |
|---|---|---|---|---|
| 7,932,836 B2* | 4/2011 | Nguyen | ................ | B60R 25/042 340/426.11 |
| 8,487,740 B2* | 7/2013 | Tsuruta | .................. | B60R 25/04 235/375 |
| 8,744,412 B1* | 6/2014 | Cazanas | .................. | H04W 4/12 340/426.1 |
| 2002/0067248 A1 | 6/2002 | Howells | | |
| 2007/0168104 A1* | 7/2007 | Nelson | ...................... | B60T 7/16 701/93 |
| 2008/0046280 A1 | 2/2008 | Horstemeyer | | |
| 2008/0231434 A1 | 9/2008 | Hermann | | |
| 2010/0214084 A1* | 8/2010 | Haste, III | ................. | B60L 1/00 340/426.11 |

(Continued)

OTHER PUBLICATIONS

International Search Report and Written Opinion dated Dec. 20, 2017 in PCT Application No. PCT/US2017/054198, 17 pages.

*Primary Examiner* — Hirdepal Singh
(74) *Attorney, Agent, or Firm* — Han Santos, PLLC; Elliott Y. Chen

(57) ABSTRACT

A device may remotely immobilize a vehicle via peer-to-peer device communication or network assisted communication. Initially, a request inputted by a user to initiate vehicle immobilization of a vehicle may be received at a master control device. The master control device may send an information query command to the vehicle communication device of the vehicle via proximity communication. Subsequently, the master control device may receive a device identifier from the vehicle communication device via the proximity communication. A vehicle immobilization request that includes the device identifier may be sent from the master control device to a wireless communication carrier. The request may prompt the wireless communication carrier to broadcast an immobilization command via a cellular communication network to the vehicle communication device of the vehicle that is identified by the device identifier. Alternatively, the master control device may directly send the immobilization command to the vehicle communication device.

20 Claims, 8 Drawing Sheets

(56) References Cited

U.S. PATENT DOCUMENTS

2014/0201064 A1     7/2014   Jackson et al.
2016/0342156 A1*   11/2016   Jackson ............... G08G 1/0175
2017/0186257 A1*    6/2017   Gerlach ............ G07C 9/00309
2017/0294114 A1*   10/2017   Reiser .................... G08C 17/02

* cited by examiner

REMOTE VEHICLE ENGINE IMMOBILIZATION

BACKGROUND

Modern vehicles are equipped with built-in communication devices that enable the vehicles to remotely communicate with different service providers. The communication devices may include subscriber identity module (SIM)-equipped network devices that enable the vehicles to use a cellular communication network to communicate with the service providers. Accordingly, the built-in communication devices may enable other devices in the vehicle to provide a multitude of services. These services may include in-vehicle security, trouble diagnostics, concierge, emergency assistance, and/or global positioning system (GPS) navigation capabilities.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
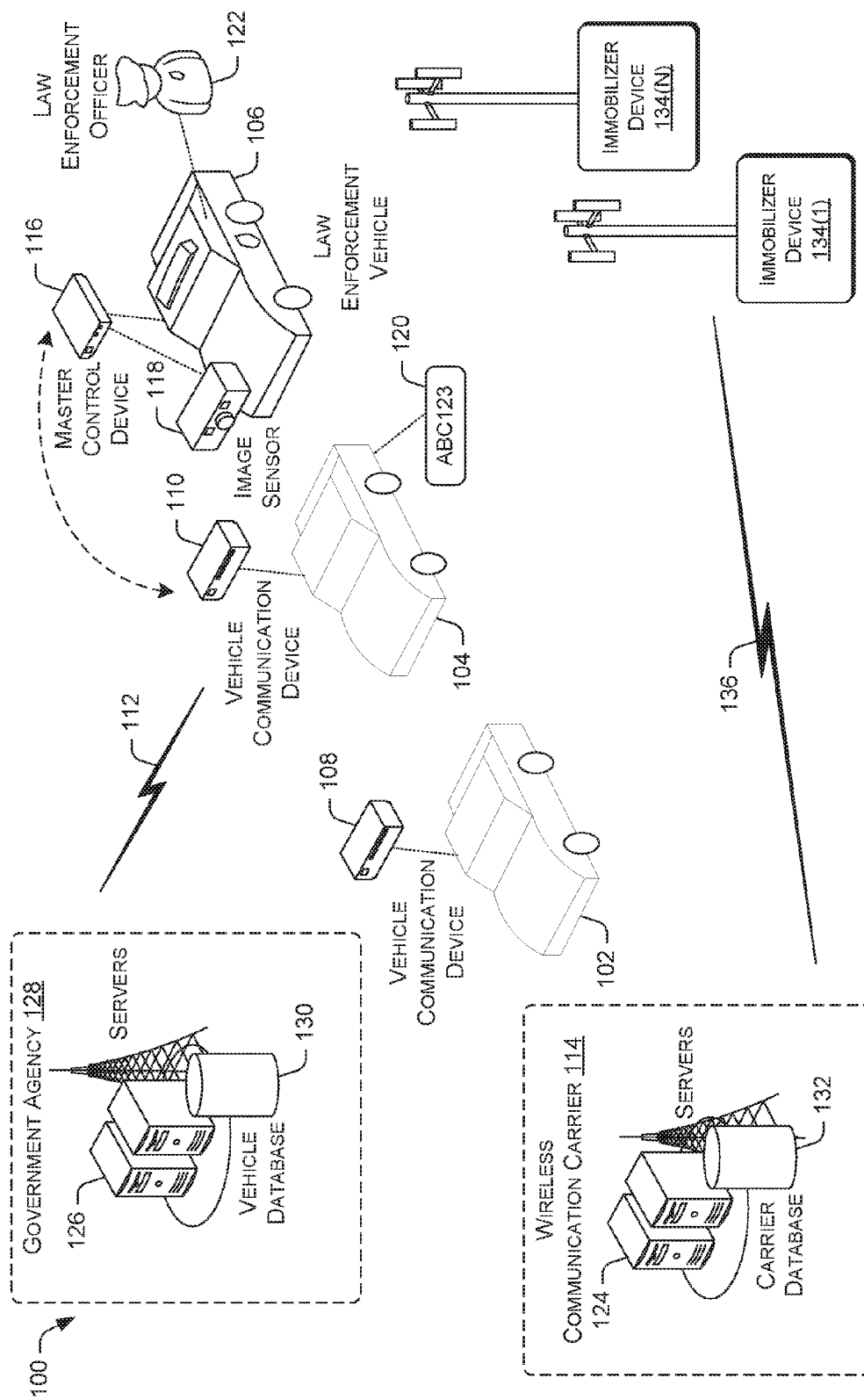
FIG. 1 illustrates an example environment for performing remote vehicle engine immobilization.

This disclosure is directed to techniques for using a master control device on a particular vehicle to initiate remote immobilization of an additional vehicle. In various embodiments, the particular vehicle that is equipped with the master control device may be a law enforcement vehicle. In some instances, the master control device on the particular vehicle may remotely immobilize the additional vehicle by using proximity communication to directly send an immobilization command to the additional vehicle in a peer-to-peer manner. The immobilization command may be received by a vehicle communication device on the additional vehicle. The vehicle communication device may be a subscriber identity module (SIM)-equipped communication device that is fitted with both a cellular communication radio and a wireless proximity communication transceiver. In turn, the vehicle communication device may trigger an engine disabler on the additional vehicle to immobilize the vehicle.

In other instances, the master control device on the initial vehicle may trigger a wireless communication carrier to use cellular communication to send an immobilization command to the additional vehicle. In further instances, the immobilization command for the additional vehicle may be sent by an immobilizer device via proximity communication with the vehicle communication device of the additional vehicle. In various embodiments, the immobilizer device may be a stationary immobilizer device or a movable immobilizer device. The immobilizer device may send the immobilization command following the immobilizer device detecting a device identifier of the vehicle communication device, and receiving a vehicle immobilization request from a law enforcement server for the device identifier.

The immobilization of the additional vehicle may involve the immediate disablement of an engine of the vehicle, a gradual diminishment of the power outputted by the engine of the vehicle until the engine is in a stopped state, or a configuration that blocks an engine restart once the engine is manually switched off by a user. In the case of the gradual power diminishment, the engine may also be further configured to block an engine restart after the engine is in a stopped state.

In at least one embodiment, a device may remotely immobilize a vehicle via peer-to-peer device communication or network assisted communication. Initially, a request inputted by a user to initiate vehicle immobilization of a vehicle may be received at a master control device. The master control device may send an information query command to the vehicle communication device of the vehicle via proximity communication. Subsequently, the master control device may receive a device identifier from the vehicle communication device via the proximity communication. A vehicle immobilization request that includes the device identifier may be sent from the master control device to a wireless communication carrier. The request may prompt the wireless communication carrier to broadcast an immobilization command via a cellular communication network to the vehicle communication device of the vehicle that is identified by the device identifier. Alternatively, the master control device may directly send the immobilization command to the vehicle communication device.

The techniques may enable a mobile device or an immobilizer device to remotely immobilize a vehicle via peer-to-peer device communication with a vehicle communication device of the vehicle. Alternatively, the remote immobilization may be achieved by the user triggering a cellular communication carrier to send an immobilization command to the vehicle communication device via a cellular communication connection. In some instances, the peer-to-peer communication may be initiated by a master control device in a law enforcement vehicle. The remote immobilization of a vehicle may enable the vehicle to be safely brought to a stop without endangering the occupants of the vehicle or bystanders who are in the vicinity of the vehicle. In instances in which the occupants of the vehicle are fleeing suspects or felons, the remote immobilization of the vehicle may provide law enforcement officers with an opportunity to detain the occupants without dangerous vehicle pursuits that can jeopardize public safety. Example implementations are provided below with reference to the following figures.

Example Environment

FIG. 1 illustrates an example environment 100 for performing remote vehicle engine immobilization. The environment 100 may include multiple vehicles, such as the vehicles 102-106. The vehicles 102 and 104 may be respectively equipped with vehicle communication devices 108 and 110. Each vehicle communication device may enable a corresponding vehicle to remotely communicate with different service providers. In various embodiments, a vehicle communication device may be a subscriber identity module (SIM)-equipped communication device that is fitted with both a cellular communication radio and a wireless proximity communication transceiver. The cellular communication radio may enable the vehicle communication device to obtain cellular communication services from a cellular communication network 112 of a cellular communication carrier that is identified in the SIM. The cellular communication network 112 may provide telecommunication and data communication in accordance with one or more technical standards, such as such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The cellular communication network 112 may be operated by the wireless communication carrier 114 or another carrier that has a network interoperability agreement with the wireless communication carrier 114.

The wireless proximity communication transceiver may enable the vehicle communication device to engage in short-range peer-to-peer communication with another device. For example, the wireless proximity communication transceiver may be a Near Field Communication (NFC) transceiver, a Bluetooth transceiver, Radio-frequency identification (RFID), and/or so forth. The vehicle communication device of each vehicle may be equipped with a unique device identifier. Additionally, each vehicle communication device may be capable of sending an immobilization signal to an engine immobilization device on each vehicle. In turn, the engine immobilization device of a vehicle that receives the immobilization signal may disable the vehicle.

The vehicle 106 may be equipped with a master control device 116 that is used to immobilize other vehicles, such as the vehicles 102 and 104. The master control device 116 may be equipped with a wireless proximity communication transceiver that interfaces with the wireless proximity communication transceivers of the vehicle communication devices 108 and 110. In this way, the master control device 116 may obtain the device identifiers of the vehicles communication devices 108 and 110, as well as broadcast immobilization commands to the vehicle communication devices 108 and 110. The master control device 116 may be further equipped with a cellular communication radio that enables the master control device 116 to use the cellular communication network 112. The master control device 116 may be connected to an image sensor 118. The image sensor 118 may enable the master control device 116 to capture images of license plates, such as the license plate 120 of the vehicle 104.

During cellular network assisted immobilization, the master control device 116 may receive a request from a user, such as a law enforcement officer 122, to remotely immobilize a vehicle. In turn, the master control device 116 may establish proximity communication with the vehicle communication device of the vehicle to obtain a device identifier of the vehicle communication device. Subsequently, the master control device 116 may send a vehicle immobilization request that includes the device identifier to one or more servers 124 of the wireless communication carrier 114. In turn, the servers 124 may execute software that cause the cellular communication network 112 to broadcast an immobilization command that includes the device identifier. The vehicle communication device of the vehicle may receive the immobilization command via the cellular communication network 112 and verify the device identifier in the command. Following verification of the device identifier, the vehicle communication device may command an engine immobilization device of the vehicle to immobilize the vehicle.

In an alternative scenario of the cellular network assisted immobilization, the master control device 116 may fail to establish proximity communication with the vehicle communication device of the vehicle. For example, the failure may be due to signal interference or the vehicle being out of signal range. As a result, the master control device 116 may be unable obtain a device identifier of the vehicle communication device within a predetermined amount of time. In such an event, the master control device 116 may automatically activate the image sensor 118 to capture a license plate number of the vehicle. Subsequently, the master control device 116 may use the cellular communication network 112 to send the license plate number to one or more servers 126 of a government agency 128. In turn, the servers 126 may execute software that queries a vehicle database 130 for a vehicle identifier that matches the license plate. The vehicle identifier of a vehicle may be a vehicle identification number (VIN), a chassis number, or another identifier that uniquely identifies the vehicle. For example, the government agency 128 may be the Department of Motor Vehicles (DMV) or Department of Licensing (DOL) that administers the registration of motor vehicles in the jurisdiction. Accordingly, the vehicle database 130 may be a database that correlates license plate numbers of vehicles with vehicle identifiers of the vehicles. The servers 126 may return a vehicle identifier of the vehicle to the master control device 116 via the cellular communication network 112.

Subsequently, the master control device 116 may send a vehicle immobilization request that includes the vehicle identifier to one or more servers 124 of the wireless communication carrier 114. In turn, the servers 124 may execute software that queries a carrier database 132 for a device identifier that matches the vehicle identifier. The carrier database 132 may be a database that correlates vehicle identifiers of vehicles with device identifiers of vehicle communication devices that are installed on the vehicles. Upon obtaining a device identifier, the software on the servers 124 may cause the cellular communication network 112 to broadcast an immobilization command to the vehicle communication device that is associated with the device identifier.

However, in peer-to-peer immobilization, the master control device 116 may receive a request from a user, such as a law enforcement officer 122, to remotely immobilize a vehicle. In turn, the master control device 116 may establish proximity communications with the vehicle communication device of the vehicle to obtain a device identifier of the vehicle communication device. At this point, instead of sending a vehicle immobilization request to the wireless communication carrier 114, the master control device 116 may directly broadcast an immobilization command that includes the device identifier to the vehicle via proximity communication. In some embodiments, the master control device 116 may initiate peer-to-peer immobilization in the event that access to the cellular communication network 112 is unavailable.

In an alternative scenario of the peer-to-peer immobilization, the master control device 116 may be unable obtain a device identifier of the vehicle communication device within a predetermined amount of time. In such an event, the master control device 116 may once again automatically activate the image sensor 118 to capture a license plate number of the vehicle. Subsequently, the master control device 116 may use the license plate number to obtain a corresponding vehicle identifier from the vehicle database 130 of the government agency 128. The vehicle identifier is further sent by the master control device 116 to the wireless communication carrier 114 for querying against the carrier database 132, such that the master control device 116 may obtain a corresponding device identifier of the vehicle communication device in the vehicle. In such instances, the master control device may use the cellular communication network 112 to obtain access to the vehicle database 130 and the carrier database 132. Subsequently, the master control device 116 may directly broadcast an immobilization command that includes the device identifier to the vehicle via proximity communication.

In other embodiments, immobilizer devices 134(1)-134(N) may be deployed at multiple locations in a geographical area. The immobilizer devices 134(1)-134(N) may be configured to continuously scan for the device identifiers of vehicle communication device-equipped vehicles traveling in the geographical area in order to detect vehicles that are of interest to a law enforcement agency. For example, a vehicle may be subject to a stolen vehicle report, an all-points bulletin (APB), an Amber alert, and/or another type of emergency broadcast alert. Each of the immobilizer devices 134(1)-134(N) may be linked to the wireless communication carrier 114 via a network 136. The network 136 may include a local area network ("LAN"), a larger network such as a wide area network ("WAN"), or a collection of networks, such as the Internet. Further, the network 136 may include wired and/or wireless link components. In various embodiments, an immobilizer device may be equipped with a cellular communication radio that enables the immobilizer device to communicate via the cellular communication network 112, a wired network transceiver, and a wireless proximity communication transceiver that enables the immobilizer device to engage in communication with vehicle communication devices. In some instances, the immobilizer devices 134(1)-134(N) may include immobilizer devices that are deployed as standalone fixtures, fixtures on existing structures, or movable fixtures. For example, the existing structures may include toll booths, gas stations, traffic lights, light poles, traffic signs, and/or so forth. In another example, the immobilizer devices 134(1)-134(N) may include immobilizer devices that are mounted on wheeled dollies or trailers that can be moved and positioned at different locations.

In operation, an immobilizer device may periodically broadcast information query commands. Alternatively, the immobilizer device may broadcast an information query command when an image sensor of the device detects a vehicle approaching within a predetermined distance of the device. The information query commands may result in a vehicle communication device of a vehicle responding with a vehicle identifier. For example, the immobilizer device may receive a vehicle identifier from the vehicle communication device 108 of the vehicle 102. Subsequently, the immobilizer device may use the cellular communication network 112 or the network 136 to send the device identifier to the servers 124 of the wireless communication carrier 114. In turn, the one or more servers 124 may execute software that queries the carrier database 132 for a vehicle identifier that matches the device identifier. The vehicle identifier may be sent by the wireless communication carrier 114 to the servers of a law enforcement agency. In response, the servers of the law enforcement agency may respond with a vehicle immobilization request if the law enforcement agency determines that the vehicle is subject to immobilization. For example, the servers of the law enforcement agency may include software that consult the vehicle database 130 to determine a license plate number that corresponds to the vehicle identifier. The software may further check whether the license plate number matches a flagged license plate number targeted for immobilization. Accordingly, if the immobilizer device receives a vehicle immobilization request for the vehicle, the immobilizer device may directly broadcast an immobilization command that includes the device identifier to the vehicle via proximity communication.

Example Device Components

Figure 2:
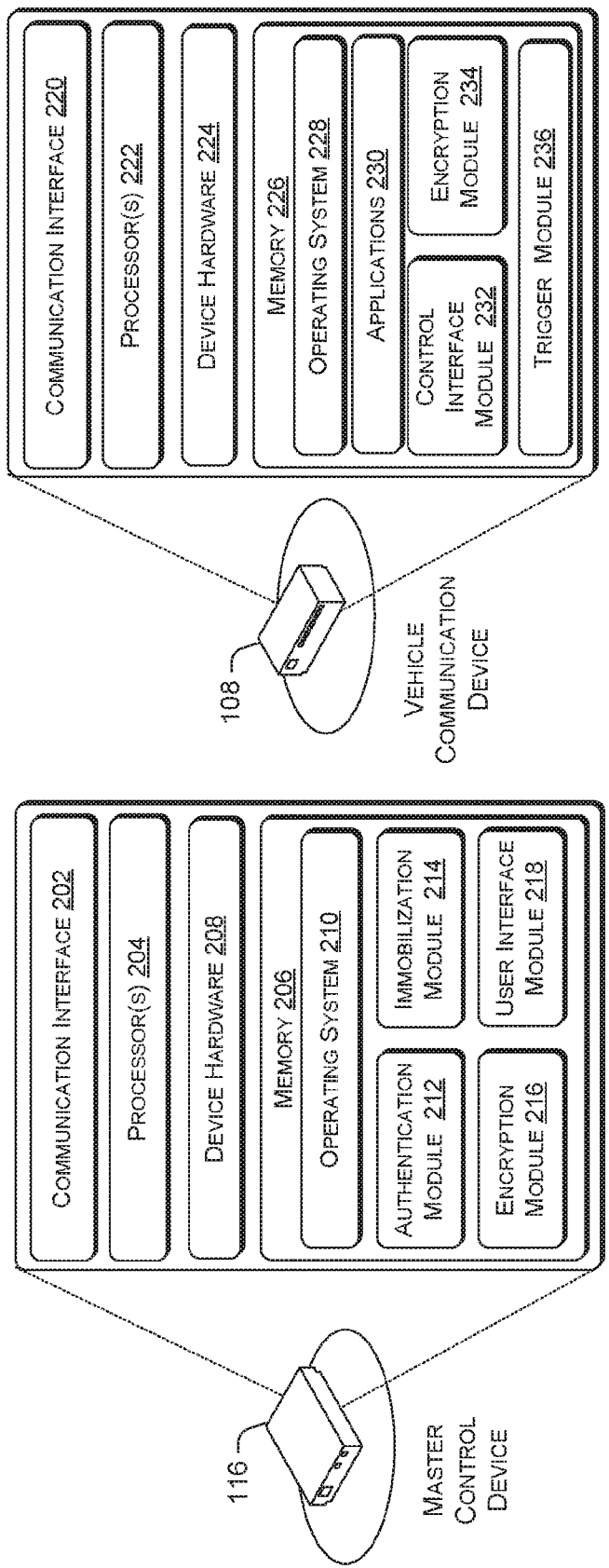
FIG. 2 is a block diagram showing various components of a master control device and a vehicle communication device.

FIG. 2 is a block diagram showing various components of a master control device and a vehicle communication device. The master control device 116 may include a communication interface 202, one or more processors 204, memory 206, and device hardware 208. The communication interface 202 may include wireless and/or wired communication components that enable the master control device 116 to transmit and receive data with other networked devices. In various embodiments, the communication interface 202 may include a network transceiver and proximity communication transceiver. The device hardware 208 may include additional hardware that performs user interface, data display, data communication, data storage, and/or other server functions. In at least one embodiment, the device hardware 208 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the master control device 116 may implement an operating system 210. The operating system 210 may include components that enable the master control device 116 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The operating system 210 may be used to implement an authentication module 212, an immobilization module 214, an encryption module 216, and a user interface module 218. These modules may include routines, program instructions, objects, and/or data structures that perform particular tasks or implement particular abstract data types.

The authentication module 212 may authenticate a user so that the user may create or log into a user account on the master control device 116. In various embodiments, the authentication module 212 may prompt a user to enter an authentication credential for a corresponding user account. The authentication credential may include one or more of a user name, a password, an electronic identifier, a digital certificate, biometric characteristics, and/or the like. In instances in which the user is a law enforcement officer, the authentication credential may include a user identifier in the form of an officer identifier that is assigned to the law enforcement officer.

The authentication module 212 may compare the inputted authentication credential to a list of authorize authentication credentials for user accounts stored on the master control device 116. Alternatively, the authentication module 212 may send the authentication credential to an authentication server for authentication. For example, the authentication server may be operated by a law enforcement agency and stores authentication credentials of officers that are authorized to perform remote vehicle immobilization. Accordingly, the authentication module 212 may permit the user access to the functionalities of the master control device 116 when the inputted authentication credential is found within a list of authorized authentication credentials or deemed by an authentication server as authorized.

The immobilization module 214 may initiate the vehicle immobilization of a vehicle in the proximity of the master control device 116 based on a request inputted by a user. In response to the request, the immobilization module 214 may use a proximity communication transceiver to send an information query command to a vehicle communication device of the vehicle. Subsequently, the immobilization module 214 may determine whether a device identifier and a vehicle description of the vehicle is received from the vehicle communication device within a predetermined amount of time. The vehicle description of the vehicle may include a make, a model, a vehicle color, a vehicle type, a model year, and/or other pertinent information that enables the user to identify the vehicle.

The immobilization module 214 may display the vehicle description of the vehicle on a display of the master control device 116 with a request that the user confirm the vehicle description. The user may confirm the vehicle description by providing a specific user input to the immobilization module 214. The confirmation prompt may serve to ensure that the correct vehicle will be immobilized, as there may be multiple vehicles that are within proximity communication range of the master control device 116. Following the confirmation of the vehicle description, the immobilization module 214 may initiate a peer-to-peer immobilization or a cellular network assisted immobilization of the vehicle. The immobilization module 214 may initiate peer-to-peer immobilization based on a user configuration setting, based on the vehicle being within proximity communication range, and/or based on the lack of an adequate cellular communication network signal (e.g., signal strength below a strength threshold). The immobilization module 214 may initiate peer-to-peer immobilization by broadcasting an immobilization command that includes the device identifier of the vehicle via proximity communication.

On the other hand, the immobilization module 214 may initiate cellular network assisted immobilization when proximity communication is unreliable or when configured based on a user inputted configuration setting. For example, proximity communication with the vehicle communication device of the vehicle may be unreliable due to signal interference or the vehicle being out of proximity communication range. As a consequence, the immobilization module 214 may be unable to receive the device identifier and the vehicle description of the vehicle in the predetermined amount of time. In such a scenario, the immobilization module 214 may activate the image sensor 118 to capture a license plate number of the vehicle. The immobilization module 214 may include a software algorithm for recognizing alphanumeric text from graphical images. The license plate number may then be used by the immobilization module 214 to obtain a corresponding vehicle identifier from the vehicle database 130. Subsequently, the immobilization module 214 may send a vehicle immobilization request that includes the vehicle identifier to the wireless communication carrier 114. In turn, the vehicle immobilization request may trigger the wireless communication carrier 114 to broadcast a corresponding immobilization command to the vehicle using the cellular communication network 112.

Alternatively, the proximity communication between the immobilization module 214 and the vehicle communication device of the vehicle may become disrupted after the immobilization module 214 has obtained the device identifier, resulting in the peer-to-peer broadcast of the immobilization request becoming ineffective. In such an instance, the immobilization module 214 may send a vehicle immobilization request that includes the device identifier to the wireless communication carrier 114. In turn, the vehicle immobilization request may trigger the wireless communication carrier 114 to broadcast a corresponding immobilization command to the vehicle using the cellular communication network 112. In some embodiments, the vehicle immobilization request may further include the user identifier of the user that initiated the vehicle immobilization request. Accordingly, the servers 124 of the wireless communication carrier 114 may execute a verification algorithm to ensure that the user identifier belongs to a user that is authorized to initiate vehicle immobilization. In an example in which the user identifier is an officer identifier, the verification algorithm may send the user identifier to a verification application at the law enforcement agency to verify that the corresponding law enforcement officer is authorized to initiate immobilization of vehicles. In another example, the verification algorithm may check the user identifier against an internal database of users who are authorized to initiate vehicle immobilizations. In at least one embodiment, the internal database may be periodically updated based on authorization data from various government agencies, such as law enforcement agencies.

Following the broadcast of an immobilization command, the immobilization module 214 may also receive notifications either directly from a vehicle communication device of a vehicle via proximity communication or from the wireless communication carrier 114 via the cellular communication network 112. The notifications may include a notification that the immobilization of a vehicle is in progress once a corresponding vehicle communication device has verified and implemented the immobilization command. The notifications may further include a notification that the vehicle is immobilized once the vehicle communication device receives an immobilization notification from an engine disabler of the vehicle.

The encryption module 216 may work with the encryption modules that are on the vehicle communication devices, the servers 124 of the wireless communication carrier 114, and the servers 126 of the government agency 128 to ensure that the data exchanged between the different entities are encrypted. In various embodiments, the encryption module 216 may encrypt outgoing data and decrypted incoming data using various encryption schemes. For example, the encryption may be implemented using various asymmetric and symmetric encryption techniques such as public key infrastructure (PKI) key negotiation and encryption, Diffie-Hellman key exchange, and/or so forth. In some instances, the encryption module 216 may also implement hash-based techniques to specify and verify the authenticity of the data that are exchanged between the entities. For example, the hash-based techniques may include the use of MD5 hashing, SHA-1 hashing, and/or so forth, to generate keyed-hash message authentication codes (HMAC).

The user interface module 218 may provide interface options for the user to configure the functionalities of the master control device 116. For instance, a configuration menu provided by the user interface module 218 may enable the user to configure the immobilization module 214 to initially default to either peer-to-peer vehicle immobilization or cellular network assisted immobilization. Another configuration menu provided by the user interface module 218 may enable the user to customize the amount of time the immobilization module 214 waits before activating the image sensor 118 to scan for a license plate number.

The vehicle communication device 108 may include a communication interface 220, one or more processors 222, device hardware 224, and memory 226. As an example, the vehicle communication device 108 may correspond to vehicle communication device 110. The communication interface 220 may include wireless and/or wired communication components that enable the vehicle communication device to transmit data to and receive data from other networked devices. In various embodiments, the communication interface 220 may include a network transceiver and proximity communication transceiver. The device hardware 224 may include additional hardware that performs user interface, data display, data communication, data storage, and/or other server functions. In at least one embodiment, the device hardware 224 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods. For example, the device hardware 224 may further include signal converters, antennas, modems, hardware decoders and encoders, graphic processors, a SIM card slot, and/or the like that enable the vehicle communication device 108 to execute applications and provide telecommunication and data communication functions. A SIM card may be inserted into the SIM card slot of the vehicle communication device 108. Accordingly, the SIM card may enable the vehicle communication device 108 to obtain telecommunication and/or data communication services from the wireless communication carrier 114 or another carrier.

The memory 226 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 222 and the memory 226 of the vehicle communication device may implement an operating system 228. The operating system 228 may include components that enable the master control device 116 to receive and transmit data via various interfaces (e.g., user controls, communication interface, and/or memory input/output devices), as well as process data using the processors 222 to generate output. The operating system 228 may include a presentation component that presents the output (e.g., display the data on an electronic display, store the data in memory, transmit the data to another electronic device, etc.). Additionally, the operating system 228 may include other components that perform various additional functions generally associated with an operating system. The operating system 228 may implement applications 230. The applications 230 may include software that enable other software on the device to exchange data with service providers. For example, the applications 230 may include data collection applications, vehicle diagnostic applications, navigation applications, autopilot applications, security applications, and/or so forth. The operating system 228 may be used to implement a control interface module 232, an encryption module 234, and trigger module 236. These modules may include routines, program instructions, objects, and/or data structures that perform particular tasks or implement particular abstract data types.

The control interface module 232 may continuously listen for information query commands and immobilization commands from another device. The information query commands may be received via proximity communication. In response to a query command, the control interface module 232 may respond with a device identifier of the vehicle communication device as well as the vehicle description of the corresponding vehicle that is stored in the memory 226. The control interface module 232 may receive immobilization commands via proximity communication or cellular communication.

The encryption module 234 may work with the encryption modules on other devices to ensure that the exchange of data with the other devices are encrypted. The encryption module 234 may also verify the authenticity of the requests and commands that are received by the vehicle communication device. For example, the encryption module 234 may use asymmetric or symmetric encryption to secure the data that is exchanged with the other devices. Further, the encryption module 234 may generate and use HMACs to guarantee that the requests and commands are authentic. Thus, the control interface module 232 may respond to information query commands that are authenticated by the encryption module 234.

The trigger module 236 may trigger an engine disabler to immobilize the vehicle based on an immobilization command. The immobilization command may be verified by the encryption module 234. In various embodiments, the trigger module 236 may extract a device identifier from the immobilization command. The extracted device identifier may be compared to an embedded device identifier of the vehicle communication device 108. Accordingly, if the extracted device identifier matches the embedded the device identifier, the trigger module 236 may send a signal to the engine disabler of the vehicle to immobilize the vehicle. The engine disabler of the vehicle may include software and/or hardware components that are configured to disable the engine the vehicle. Further, the trigger module 236 may generate a notification that the immobilization that the immobilization of the vehicle is in progress. Subsequently, when the engine disabler of the vehicle indicates to the trigger module 236 that the vehicle is immobilized, the trigger module 236 may generate a notification of vehicle immobilization. The trigger module 236 may send the notification back to the master control device 116 via one of the proximity communication or the cellular communication network 112.

Figure 3:
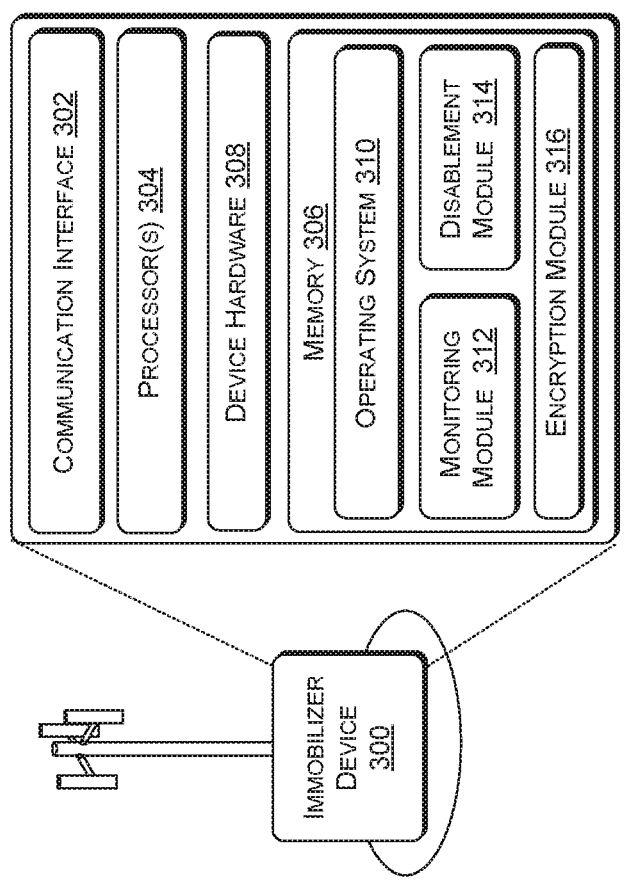
FIG. 3 is a block diagram showing various components of an immobilizer device that performs remote vehicle engine immobilization via peer-to-peer communication.

FIG. 3 is a block diagram showing various components of an immobilizer device 300 that performs remote vehicle engine immobilization via peer-to-peer communication. The immobilizer device 300 may include a communication interface 302, one or more processors 304, memory 306, and device hardware 308. The communication interface 302 may include wireless and/or wired communication components that enable the immobilizer device to transmit data to and receive data from other networked devices. In various embodiments, the communication interface 302 may include a proximity communication transceiver, as well as network transceivers that enable the immobilizer device 300 to communicate with the wireless communication carrier 114 and the government agency 128 via the network 136. The network transceivers may include a wired transceiver and a wireless transceiver. The device hardware 308 may include additional hardware that performs user interface, data display, data communication, data storage, and/or other server functions. In at least one embodiment, the device hardware 308 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the immobilizer device 300 may implement an operating system 310. The operating system 310 may include components that enable the immobilizer device 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The operating system 310 may be used to implement a monitoring module 312, a disablement module 314, and an encryption module 316. These modules may include routines, program instructions, objects, and/or data structures that perform particular tasks or implement particular abstract data types.

The monitoring module 312 may send information query commands to vehicles that are in the vicinity of the immobilizer device 300. In some embodiments, the information query commands may be sent on a periodic basis (e.g., every second, every minute, etc.). In turn, vehicle communication devices of the vehicles that are in the vicinity of the immobilizer device 300 may respond by transmitting their device identifiers. In other embodiments, the immobilizer device 300 may be equipped with an image sensor. In such embodiments, the monitoring module 312 may use an image analysis algorithm to detect the arrival of new vehicles in the vicinity of the immobilizer device 300. Accordingly, the monitoring module 312 may send an information query command when a new vehicle arrives in the vicinity of the immobilizer device 300.

The disablement module 314 may use the network 136 to send a device identifier to the servers 124 of the wireless communication carrier 114 to obtain a corresponding vehicle identifier from the carrier database 132. Following the receipt of the device identifier, the disablement module 314 may send the vehicle identifier to the servers 126 at the government agency 128 via the network 136. The servers 126 may execute an application to determine whether the vehicle that is identified by the vehicle identifier is subject to immobilization. For example, the vehicle may be subject to immobilization if it is the object of an outstanding APB, an Amber alert, a stolen vehicle report, and/or so forth. The servers 126 may make the determination using a vehicle immobilization request database. The vehicle immobilization request database may be a repository of pending vehicle immobilization requests that contains lawful requests inputted by authorized law enforcement officers of one or more law enforcement agencies. In some instances, the servers 126 may use the vehicle database 130 to determine a license plate number of the vehicle for the purpose of checking with the vehicle immobilization request database. Thus, if the disablement module 314 receives a vehicle immobilization request for a vehicle from the government agency 128, the disablement module 314 may broadcast an immobilization command that includes the device identifier of the vehicle via proximity communication for reception by the vehicle.

In some instances, the disablement module 314 may use an image sensor to capture the license plate number of a vehicle, rather than obtaining a device identifier of a vehicle communication device in the vehicle. In such instances, the disablement module 314 may send the license plate number to the servers 126 of the government agency 128. In turn, the servers 126 may execute an application to check the license plate number against the immobilization request database.

The encryption module 234 may work with the encryption modules of the other devices to ensure that the exchange of data with other devices are encrypted, and to verify the authenticity of the requests and commands that are received by the vehicle communication device. For example, the encryption module 234 may use asymmetric or symmetric encryption to secure the data that is exchanged with the other devices. Further, encryption module 234 may generate and use HMACs to guarantee that the requests and commands are authentic.

Example Processes

FIGS. 4-8 present illustrative processes 400-800 for performing remote vehicle engine immobilization. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the environment 100 of FIG. 1.

Figure 4:
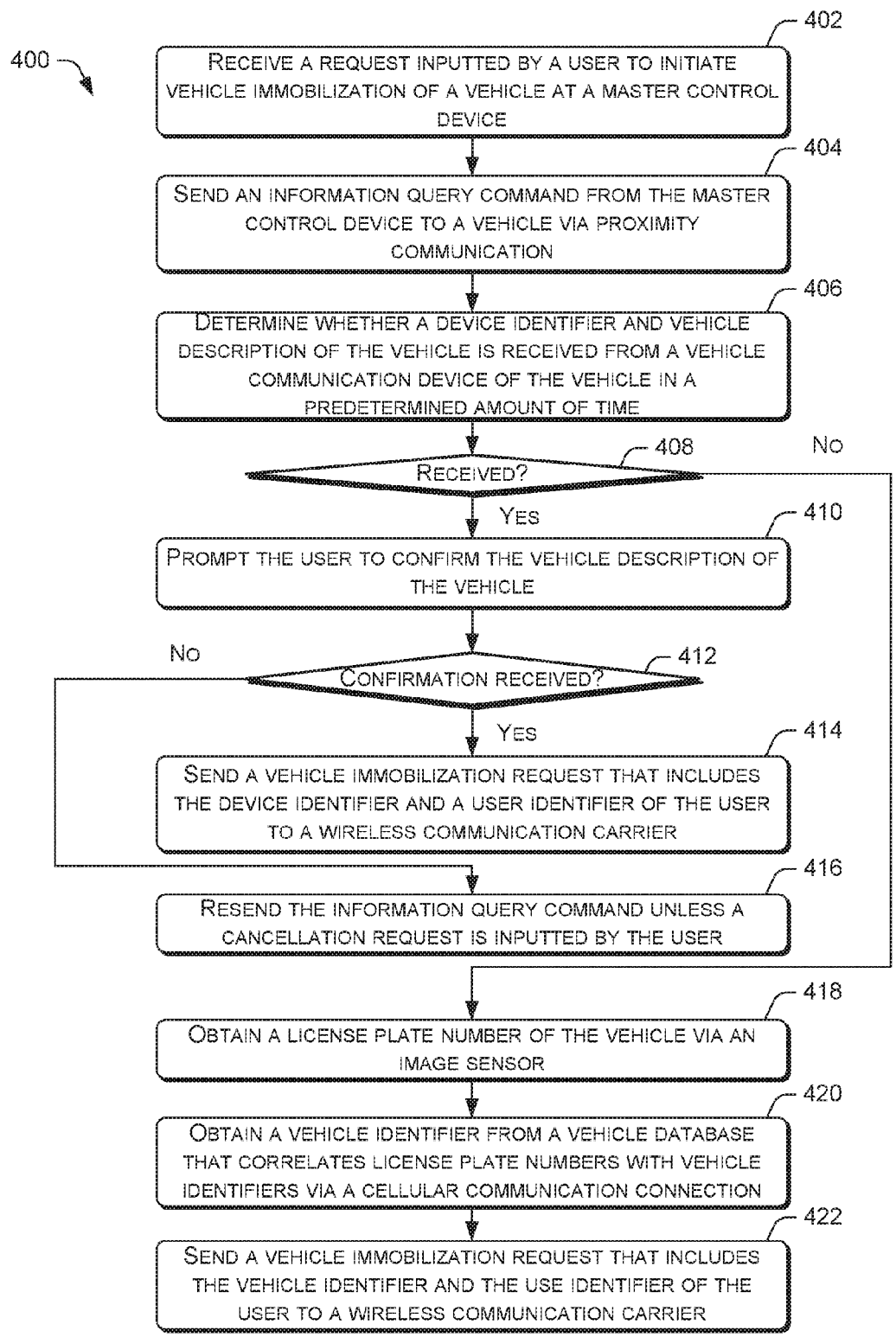
FIG. 4 is a flow diagram of an example process for a master control device to initiate a cellular network assisted vehicle immobilization of a vehicle.

FIG. 4 is a flow diagram of an example process 400 for a master control device 116 to initiate a cellular network assisted vehicle immobilization of a vehicle. At block 402, the master control device 116 may receive a request inputted by a user to initiate vehicle immobilization of a vehicle at the master control device 116. The master control device 116 may be installed on a law enforcement vehicle, such as the vehicle 106. In some instances, the user may be a law enforcement officer that is operating the vehicle 106.

At block 404, the master control device 116 may send an information query command to the vehicle via proximity communication. In various embodiments, the proximity communication may be in the form of NFC communication, Bluetooth communication, RFID communication, and/or so forth. The information query command may be received by a vehicle communication device of the vehicle.

At block 406, the master control device 116 may determine whether a device identifier and vehicle description of the vehicle is received from the vehicle communication device of the vehicle in a predetermined amount of time. The vehicle identifier of a vehicle may be a VIN, a chassis number, or another identifier that uniquely identifies the vehicle. The vehicle description of the vehicle may include a make, a model, a vehicle color, a vehicle type, a model year, and/or other pertinent information that enables the user to identify the vehicle.

Thus, at decision block 408, if the master control device 116 determines that device identifier and the vehicle description are received at the master control device 116 within the predetermined amount of time, the process 400 may proceed to block 410. At block 410, the master control device 116 may prompt the user to confirm the vehicle description of the vehicle. In various embodiments, the master control device 116 may display the vehicle description of the vehicle on a display with a request that the user confirm the vehicle description. In turn, the user may confirm the vehicle description by providing a specific user input to the master control device 116. Accordingly, at decision block 412, if the master control device 116 determines that a confirmation is received, the process 400 may proceed to block 414.

At block 414, the master control device 116 may send a vehicle immobilization request that includes the device identifier and a user identifier of the user to the wireless communication carrier 114. In some instances, the user identifier may be an officer identifier of a law enforcement officer. Returning to decision block 412, if the master control device 116 determines that no confirmation is received, the process 400 may proceed to block 416. At block 416, the master control device 116 may resend the information query command unless a cancellation request is inputted by the user. The user may decline to confirm the vehicle description if the device identifier acquired by the master control device 116 does not belong to the vehicle of interest. In such a case, the user may send such an indication to the master control device 116 via a user input. Subsequently, the resending of the information query command may enable the master control device 116 to acquire the device identifier from a vehicle communication device of another vehicle.

Returning to decision block 408, if the master control device 116 determines that device identifier and the vehicle description are not received within the predetermined amount of time, the process 400 may proceed to block 418. At block 418, the master control device 116 may obtain a license plate number of the vehicle via an image sensor, such as the image sensor 118. In various embodiments, the master control device 116 may include a software algorithm for recognizing alphanumeric text from graphical images.

At block 420, the master control device 116 may use a cellular communication connection to obtain a vehicle identifier from a vehicle database that correlates the license plate numbers with vehicle identifiers. In various embodiments, the vehicle database may be the vehicle database 130 that is operated by the government agency 128. At block 422, the master control device 116 may send a vehicle immobilization request that includes the vehicle identifier and the user identifier of the user to the wireless communication carrier.

Figure 5:
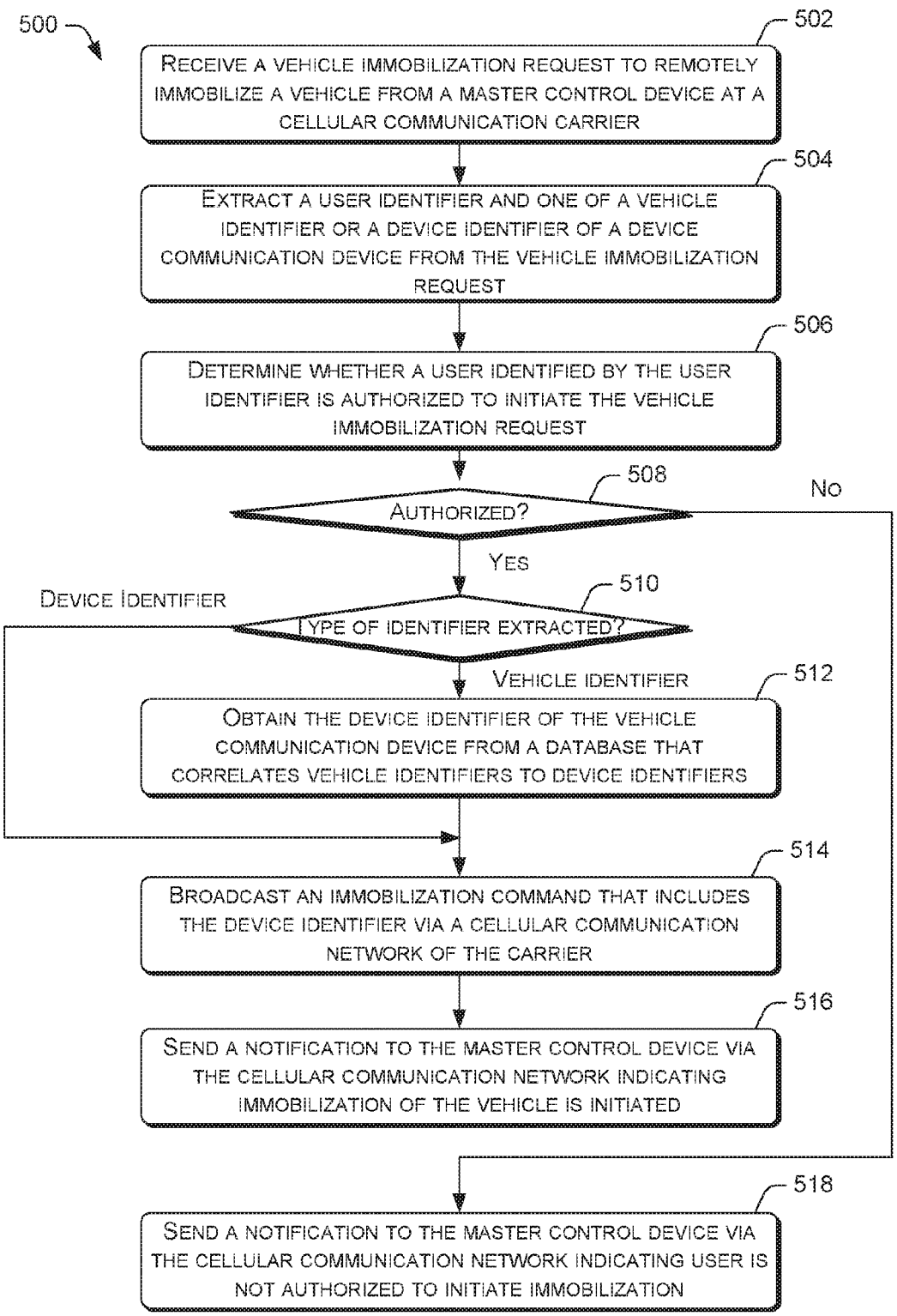
FIG. 5 is a flow diagram of an example process for a cellular communication carrier to initiate the broadcast of an immobilization command to a vehicle in response to the initiation of immobilization from the master control device.

FIG. 5 is a flow diagram of an example process 500 for a cellular communication carrier to initiate the broadcast of an immobilization command to a vehicle in response to the initiation of immobilization from the master control device. At block 502, a server application executing on the servers 124 of the wireless communication carrier 114 may receive a vehicle immobilization request to remotely immobilize a vehicle. The request may originate from a master control device, such as the master control device 116 that is on the vehicle 106. At block 504, the server application may extract a user identifier and one of a vehicle identifier or a device identifier of the vehicle communication device from the vehicle immobilization request. In some instances, the user identifier may be an office identifier of a law enforcement officer.

At block 506, the server application may determine whether the user identified by the user identifier is authorized to initiate the vehicle immobilization request. In some instances, the server application may verify the user identifier with a database of authorized users at a law enforcement agency. In other instances, the server application may verify the user identifier with a database of authorized users that reside on the servers 124 of the wireless communication carrier 114.

Accordingly, at decision block 508, if the server application determines that the user identifier is authorized, the process 500 may proceed to decision block 510. At decision block 510, the server application may determine whether a device identifier or a vehicle identifier is extracted from the vehicle immobilization request. Accordingly, if the vehicle identifier is extracted from the vehicle immobilization request, the process 500 may proceed to block 512. At block 512, the server application may obtain the device identifier of the corresponding vehicle communication device from a database that correlates vehicle identifiers with device identifiers. In various embodiments, the database may be the carrier database 132 of the wireless communication carrier 114. At block 512, the server application may broadcast an immobilization command that includes the device identifier via a cellular communication network 112 of the wireless communication carrier 114. At block 514, the server application may send a notification to the master control device (e.g., the master control device 116) via the cellular communication network 112. The notification may indicate that the immobilization of the vehicle is initiated.

Returning to the decision block 510, if the device identifier is extracted from the vehicle immobilization request, the process 500 may proceed directly to block 514. Returning to decision block 508, if the server application determines that the user identifier is not authorized, the process 500 may proceed to block 518. At block 518, the server application may send a notification to the master control device (e.g., the master control device 116) via the cellular communication network 112. The notification may indicate that the user is not authorized to initiate immobilization.

Figure 6:
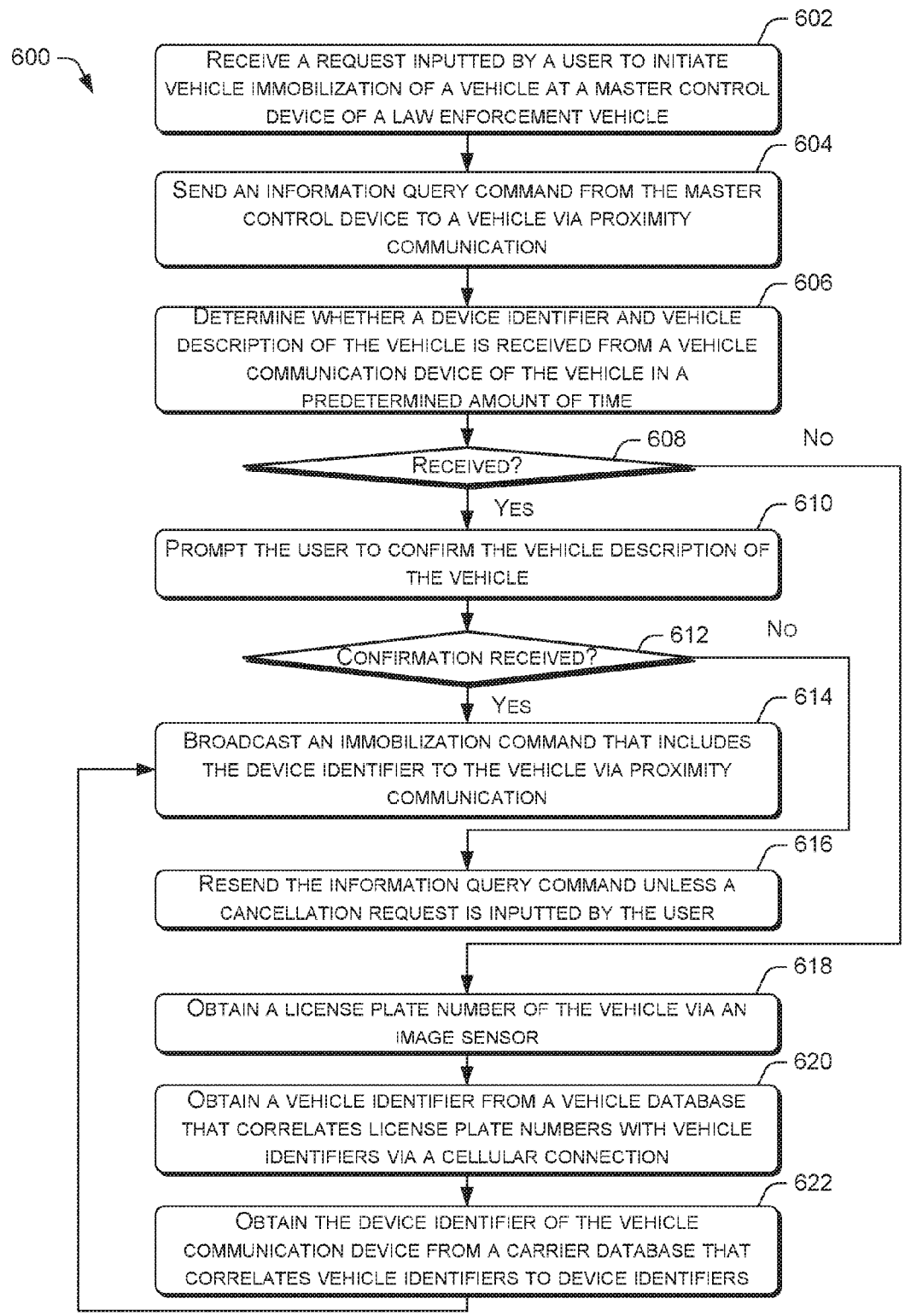
FIG. 6 is a flow diagram of an example process for a master control device to initiate a peer-to-peer vehicle immobilization of a vehicle.

FIG. 6 is a flow diagram of an example process 600 for a master control device to initiate a peer-to-peer vehicle immobilization of a vehicle. At block 602, the master control device 116 may receive a request inputted by a user to initiate vehicle immobilization of a vehicle at the master control device 116. The master control device 116 may be installed on a law enforcement vehicle, such as the vehicle 106. In some instances, the user may be a law enforcement officer that is operating the vehicle 106.

At block 604, the master control device 116 may send an information query command to the vehicle via proximity communication. In various embodiments, the proximity communication may be in the form of NFC communication, Bluetooth communication, RFID communication, and/or so forth. The information query command may be received by a vehicle communication device of the vehicle.

At block 606, the master control device 116 may determine whether a device identifier and vehicle description of the vehicle is received from the vehicle communication device of the vehicle in a predetermined amount of time. The vehicle identifier of a vehicle may be a VIN, a chassis number, or another identifier that uniquely identifies the vehicle. The vehicle description of the vehicle may include a make, a model, a vehicle color, a vehicle type, a model year, and/or other pertinent information that enables the user to identify the vehicle.

Thus, at decision block 608, if the master control device 116 determines that device identifier and the vehicle description are received at the master control device 116 within the predetermined amount of time, the process 600 may proceed to block 610. At block 610, the master control device 116 may prompt the law enforcement vehicle to confirm the vehicle description of the vehicle. In various embodiments, the master control device 116 may display the vehicle description of the vehicle on a display with a request that the user confirm the vehicle description. In turn, the user may confirm the vehicle description by providing a specific user input to the master control device 116. Accordingly, at decision block 612, if the master control device 116 determines that a confirmation is received, the process 600 may proceed to block 614. At block 614, the master control device 116 may broadcast an immobilization command that includes the device identifier to the vehicle via proximity communication.

Returning to decision block 612, if the master control device 116 determines that no confirmation is received, the process 600 may proceed to block 616. At block 416, the master control device 116 may resend the information query command unless a cancellation request is inputted by the user. The user may decline to confirm the vehicle description if the device identifier acquired by the master control device 116 does not belong to the vehicle of interest. In such a case, the user may send such an indication to the master control device 116 via a user input. Subsequently, the resending of the information query command may enable the master control device 116 to acquire the device identifier from a vehicle communication device of another vehicle. Returning to decision block 608, if the master control device 116 determines that device identifier and the vehicle description are not received within the predetermined amount of time, the process 600 may proceed to block 618.

At block 618, the master control device 116 may obtain a license plate number of the vehicle via an image sensor, such as the image sensor 118. In various embodiments, the master control device 116 may include a software algorithm for recognizing alphanumeric text from graphical images. At block 620, the master control device 116 may use a cellular communication connection to obtain a vehicle identifier from a vehicle database that correlates license plate numbers with vehicle identifiers. In various embodiments, the vehicle database may be the vehicle database 130 that is operated by the government agency 128. At block 622, master control device 116 may obtain the device identifier of the vehicle communication device from a carrier database that correlates vehicle identifiers to device identifiers. In various embodiments, the carrier database may be the carrier database 132 of the wireless communication carrier 114. The master control device 116 may access the carrier database 132 by communicating with the servers 124 via the cellular communication network 112. Subsequently, the process 600 may loop back to block 614, such that the master control device 116 may broadcast an immobilization command that includes the device identifier to the vehicle via proximity communication.

Figure 7:
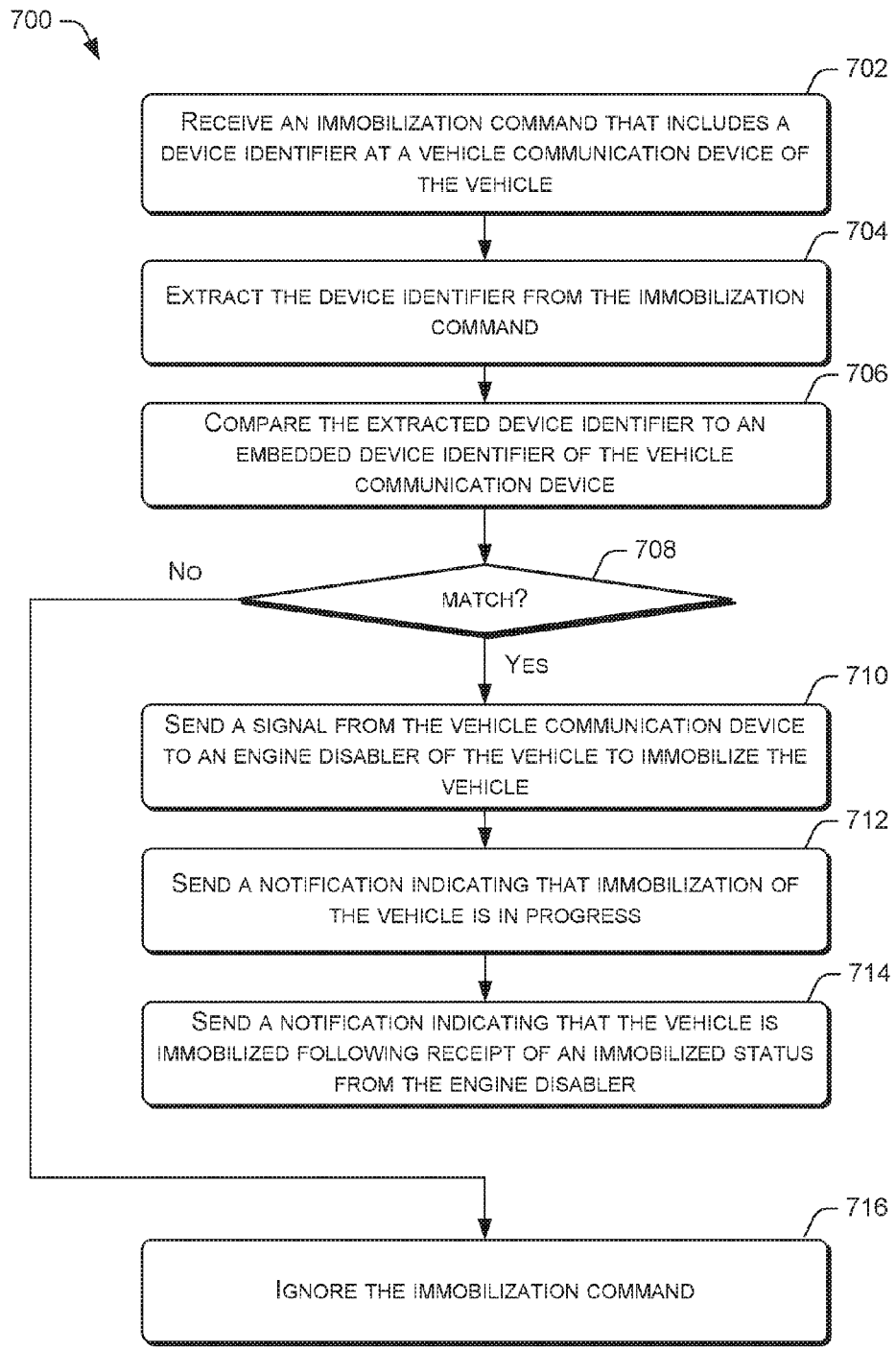
FIG. 7 is a flow diagram of an example process for a vehicle communication device on a vehicle to determine whether to disable the vehicle based on a received immobilization command.

FIG. 7 is a flow diagram of an example process 700 for a vehicle communication device on a vehicle to determine whether to disable the vehicle based on a received immobilization command. At block 702, a vehicle communication device of a vehicle may receive an immobilization command that includes a device identifier. In various embodiments, the vehicle communication device may receive the immobilization command via proximity communication or a cellular communication connection that is provided by the cellular communication network 112.

At block 704, an application on the vehicle communication device may extract the device identifier from the immobilization command. At block 706, the application may compare the extracted device identifier to an embedded device identifier of the vehicle communication device. In some instances, the embedded device identifier may be stored in a protected memory space of the vehicle communication device. At decision block 708, the application may determine whether the extracted device identifier matches the embedded device identifier of the vehicle communication device. Accordingly, if the application determines that the identifiers match, the process 700 may proceed to block 710. At block 710, the application may send a signal from the vehicle communication device to an engine disabler of the vehicle to immobilize the vehicle.

At block 712, the application may send a notification indicating that the immobilization of the vehicle is in progress. In instances in which the immobilization command is received from the wireless communication carrier 114, the application may cause the vehicle communication device to send the notification back to the wireless communication carrier 114 via the cellular communication network 112. In turn, the wireless communication carrier 114 may route the notification to a master control device that originated the immobilization command via the cellular communication network 112. However, in instances in which the immobilization command is directly received from a master control device, the application may cause the vehicle communication device to send the notification directly to the master control device via proximity communication.

At block 714, the application may send a notification indicating that the vehicle is immobilized following receipt of an immobilized status from the engine disabler. The engine disabler may provide the immobilized status to the application when an engine check by the engine disabler indicates that the engine of the vehicle is stopped or switched off. In turn, the application may route the notification either directly to a master control device that originated the immobilization command or to a wireless communication carrier 114 that forwards the notification to the master control device. Returning to decision block 708, if the application determines that the extracted device identifier does not match the embedded device identifier, the process 700 may proceed to block 716. At block 716, the application may ignore the immobilization command.

Figure 8:
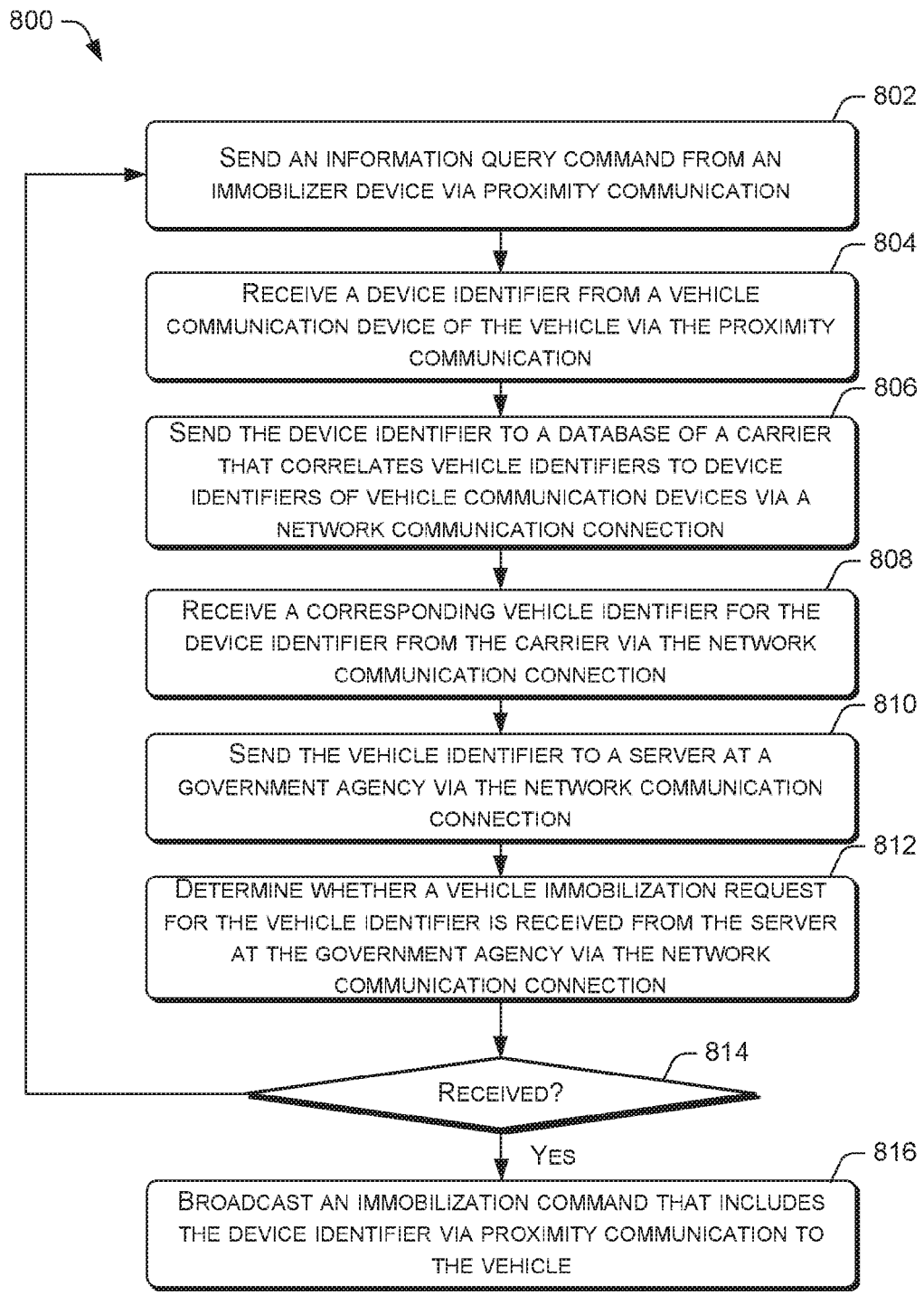
FIG. 8 is a flow diagram of an example process for automatically initiating remote vehicle immobilization of a vehicle using an immobilizer device.

FIG. 8 is a flow diagram of an example process 800 for automatically initiating remote vehicle immobilization of a vehicle using an immobilizer device. At block 802, the immobilizer device may send an information query command to the vehicle via proximity communication. In various embodiments, the proximity communication may be in the form of NFC communication, Bluetooth communication, RFID communication, and/or so forth. The information query command may be received by a vehicle communication device of the vehicle.

At block 804, the immobilizer device may receive a device identifier from a vehicle communication device of the vehicle via proximity communication. In some instances, the device identifier may be one of multiple identifiers that are received by the immobilizer device. In such instances, the immobilizer device may hold one or more of the device identifiers in a buffer until all of the device identifiers are processed. At block 806, the immobilizer device may send the vehicle identifier to a database of a wireless communication carrier that correlates vehicle identifiers to device identifiers of vehicle communication devices. In various embodiments, the database may be the carrier database 132 of the wireless communication carrier 114. In such embodiments, the vehicle identifier may be sent via a network communication connection. The network communication connection may be a connection that is provided by the cellular communication network 112 and/or the network 136. At block 808, the immobilizer device may receive a corresponding vehicle identifier for the device identifier from the wireless communication carrier via the network communication connection.

At block 810, the immobilizer device may use the network communication connection provided by the cellular communication network 112 to send the vehicle identifier to a server at a government agency. In various embodiments, the server may execute an application to determine whether the vehicle that is identified by the vehicle identifier is subject to immobilization. For example, the vehicle may be subject to immobilization if it is the target of an outstanding APB, an Amber alert, a stolen vehicle report, and/or so forth.

At block 812, the immobilizer device may determine whether a vehicle immobilization request for the vehicle identifier is received from the server at the government agency via the network communication connection. Accordingly, at decision block 814, if the immobilizer device determines that the vehicle immobilization request is received, the process 800 may proceed to block 816. At block 816, the immobilizer device may broadcast an immobilization command that includes the device identifier to the vehicle via proximate communication. However, if the immobilizer device determines that no vehicle immobilization request is received, the process 800 may loop back to block 802.

The techniques may enable a mobile device or an immobilizer device to remotely immobilize a vehicle via peer-to-peer device communication with a vehicle communication device of the vehicle. Alternatively, the remote immobilization may be achieved by the user triggering a cellular communication carrier to send an immobilization command to the vehicle communication device via a cellular communication connection. In some instances, the peer-to-peer communication may be initiated by a master control device in a law enforcement vehicle. The remote immobilization of a vehicle may enable the vehicle to be safely brought to a stop without endangering the occupants of the vehicle or bystanders who are in the vicinity of the vehicle. In instances in which the occupants of the vehicle are fleeing suspects or felons, the remote immobilization of the vehicle may provide law enforcement officers with an opportunity to detain the occupants without dangerous vehicle pursuits that can jeopardize public safety.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   receiving, at a master control device of a first vehicle, a request inputted by a user to initiate vehicle immobilization of a second vehicle;
   sending an information query command from the master control device of the first vehicle to a vehicle communication device of the second vehicle via proximity communication directly between the master control device on the first vehicle and the vehicle communication device on the second vehicle in response to the request;
   receiving, at the master control device of the first vehicle, a device identifier from the vehicle communication device of the second vehicle via the proximity communication in response to the information query command, the device identifier uniquely identifying the vehicle communication device; and sending, from the master control device of the first vehicle, a vehicle immobilization request that includes the device identifier of the vehicle communication device to a wireless communication carrier prompting the wireless communication carrier to broadcast an immobilization command via a cellular communication network to the vehicle communication device of the second vehicle that is identified by the device identifier.

2. The computer-implemented method of claim 1, wherein the proximity communication is one of near field communication (NFC), Bluetooth communication, or radio-frequency identification (RFID) communication.

3. The computer-implemented method of claim 1, wherein the receiving the device identifier further includes receiving a vehicle description of the second vehicle along with the device identifier, and wherein the sending the vehicle immobilization request includes sending the vehicle immobilization request in response to a user input that confirms the vehicle description.

4. The computer-implemented method of claim 1, wherein the sending the immobilization command includes sending a user identifier of the user along with the device identifier to the wireless communication carrier, such that the wireless communication carrier sends the immobilization command in response to the user identified by user identifier being authorized to initiate the request.

5. The computer-implemented method of claim 1, wherein the broadcast of the immobilization command causes the second vehicle to perform one of an immediate disablement of an engine of the second vehicle, a gradual diminishment of power outputted by the engine of the second vehicle until the engine is in a stopped state, or a configuration of the engine to refuse to restart once the engine is manually switched off.

6. The computer-implemented method of claim 1, further comprising receiving, via the cellular communication network, at least one of:
a notification from the wireless communication carrier indicating that immobilization of the second vehicle is initiated following the broadcast of the immobilization command by the cellular communication network;
a notification from the vehicle communication device that immobilization of the second vehicle is in progress following the vehicle communication device sending a signal to an engine disabler of the second vehicle; or
a notification from the vehicle communication device that the second vehicle is immobilized following the vehicle communication device receiving a vehicle immobilized status from the engine disabler.

7. The computer-implemented method of claim 1, further comprising:
receiving, at the master control device of the first vehicle, an additional request to initiate vehicle immobilization of a third vehicle;
obtaining a license plate number of the third vehicle via an image sensor following the additional request;
obtaining a vehicle identifier for the license plate number from a vehicle database of a government agency that correlates license plate numbers with vehicle identifiers; and
sending an additional vehicle immobilization request that includes the vehicle identifier to the wireless communication carrier prompting the wireless communication carrier to obtain an additional device identifier of an additional vehicle communication device on the third vehicle that corresponds to the vehicle identifier, and to broadcast an additional immobilization command via a cellular communication network to the additional vehicle communication device of the third vehicle that is identified by the additional device identifier.

8. The computer-implemented method of claim 7, further comprising sending an additional information query command from the master control device of the first vehicle to the additional vehicle communication device of the third vehicle via proximity communication between the master control device on the first vehicle and the additional vehicle communication device on the third vehicle in response to the additional request, wherein the obtaining the license plate number includes obtaining the license plate number of the third vehicle in response to the additional vehicle communication device of the third vehicle failing to respond to the additional information query command within a predetermine amount of time.

9. The computer-implemented method of claim 1, further comprising:
receiving, at the master control device of the first vehicle, an additional request inputted by the user to initiate vehicle immobilization of a third vehicle;
sending an additional information query command from the master control device of the first vehicle to an additional vehicle communication device of the third vehicle via proximity communication in response to the additional request;
receiving, at the master control device of the first vehicle, an additional device identifier from the additional vehicle communication device of the third vehicle via the proximity communication between the master control device on the first vehicle and the additional vehicle communication device on the third vehicle in response to the additional information query command; and
broadcasting, via the master control device of the first vehicle, an additional immobilization command to the additional vehicle communication device with the additional device identifier via the proximity communication, the additional immobilization command causing the additional vehicle communication device to send a signal to an engine disabler of the third vehicle.

10. The computer-implemented method of claim 9, wherein the additional immobilization command includes the additional device identifier, and wherein the additional vehicle communication device sends the signal in response to the additional device identifier matching an embedded device identifier stored in the additional vehicle communication device.

11. The computer-implemented method of claim 1, further comprising:
receiving, at a master control device of the first vehicle, an additional request to initiate vehicle immobilization of a third vehicle;
obtaining a license plate number of the third vehicle via an image sensor of the first vehicle following the additional request;
obtaining a vehicle identifier for the license plate number from a vehicle database of a government agency that correlates license plate numbers with vehicle identifiers;
obtaining an additional device identifier of an additional vehicle communication device on the third vehicle that is associated with the vehicle identifier from a carrier database of the wireless communication carrier that correlates vehicle identifiers to device identifiers, the additional device identifier uniquely identifying the additional vehicle communication device; and broadcasting, via the master control device of the first vehicle, an additional immobilization command to the additional vehicle communication device with the additional device identifier via proximity communication, the additional immobilization command causing the additional vehicle communication device to send a signal to an engine disabler of the third vehicle to immobilize the third vehicle.

12. The computer-implemented method of claim 11, wherein the additional immobilization command includes the additional device identifier, and wherein the additional vehicle communication device sends the signal in response to the additional device identifier matching an embedded device identifier stored in the additional vehicle communication device.

13. One or more non-transitory computer-readable media storing computer-executable instructions that upon execution cause one or more processors to perform acts comprising:

receiving a vehicle immobilization request to remotely immobilize a first vehicle from a master control device of a second vehicle, the vehicle immobilization request being initiated in response to a user input of a user;

extracting a vehicle identifier or a device identifier from the vehicle immobilization request, the device identifier being obtained by the master control device of the second vehicle from a vehicle communication device of the first vehicle via proximity communication directly between the master control device of the second vehicle and the vehicle communication device of the first vehicle, the device identifier uniquely identifying the vehicle communication device;

broadcasting an immobilization command that includes the device identifier via a cellular communication network to the first vehicle to immobilize the first vehicle, when the device identifier is extracted from the vehicle immobilization request; and obtaining the device identifier for the vehicle identifier from a carrier database of a wireless communication carrier, the carrier database correlating vehicle identifiers with device identifiers, and broadcasting the immobilization command that includes the device identifier via the cellular communication network to the first vehicle, when the vehicle identifier is extracted from the vehicle immobilization request.

14. The one or more non-transitory computer-readable media of claim 13, wherein the proximity communication is one of near field communication (NFC), Bluetooth communication, or Radio-frequency identification (RFID) communication, and wherein the acts further comprise extracting a user identifier from the vehicle immobilization request, and wherein the broadcasting includes broadcasting the immobilization command in response to the user identified by user identifier being authorized to initiate the request.

15. The one or more non-transitory computer-readable media of claim 13, wherein the broadcasting of the immobilization command causes the first vehicle to perform one of an immediate disablement of an engine of the first vehicle, a gradual diminishment of power outputted by the engine of the first vehicle until the engine is in a stopped state, or a configuration of the engine to refuse to restart once the engine is manually switched off.

16. The one or more non-transitory computer-readable media of claim 13, wherein the acts further comprise sending at least one of following notifications to the master control device of the first vehicle:

a notification indicating that immobilization of the first vehicle is initiated following the broadcast of the immobilization command by the cellular communication network;

a notification from the vehicle communication device that immobilization of the first vehicle is in progress following the vehicle communication device sending a signal to an engine disabler of the first vehicle; or a notification from the vehicle communication device that the first vehicle is immobilized following the vehicle communication device receiving a vehicle immobilized status from the engine disabler.

17. A device on a first vehicle, comprising:

one or more processors; and memory having instructions stored therein, the instructions, when executed by the one or more processors, cause the one or more processors to perform acts comprising:

sending an information query command to a vehicle communication device of a second vehicle via proximity communication, in response to receiving a request inputted by a user to initiate vehicle immobilization of the second vehicle;

receiving a device identifier from the vehicle communication device of the second vehicle via the proximity communication in response to the information query command, the device identifier uniquely identifying the vehicle communication device of the second vehicle; and broadcasting an immobilization command that includes the device identifier to the second vehicle via the proximity communication, the immobilization command causing the vehicle communication device to send a signal to an engine disabler of the second vehicle in response to the device identifier included in the immobilization command matches an embedded device identifier stored in the vehicle communication device of the second vehicle.

18. The device of claim 17, wherein the acts further comprising:

receiving, at the device of the first vehicle, an additional request inputted by the user to initiate vehicle immobilization of a third vehicle;

sending an additional information query command from the device of the first vehicle to an additional vehicle communication device of the third vehicle via proximity communication in response to the additional request;

receiving, at the device of the first vehicle, an additional device identifier from the additional vehicle communication device of the third vehicle via the proximity communication between the device on the first vehicle and the additional vehicle communication device on the third vehicle in response to the additional information query command; and broadcasting, via the device of the first vehicle, an additional immobilization command to the additional vehicle communication device with the additional device identifier via the proximity communication, the additional immobilization command causing the additional vehicle communication device to send a signal to an engine disabler of the third vehicle.

19. The device of claim 17, wherein the acts further comprise:
 receiving a corresponding vehicle identifier for the device identifier from a wireless communication carrier via a wired or wireless network communication connection; and
 sending the vehicle identifier to a server at a government agency via the wired or wireless network communication connection, wherein the broadcasting includes broadcasting the immobilization command in response to receiving a vehicle immobilization request from the server of the government agency.

20. The device of claim 17, wherein one or more of the device identifier and the immobilization command as exchanged between multiple devices are protected by asymmetric or symmetric encryption, or authenticated by the multiple devices via hash authentication codes.

\* \* \* \* \*